April 13, 1965  P. McHENRY ALBERT  3,177,760
APPARATUS EMBODYING PLURAL LIGHT PATHS
FOR MEASURING THE TURBIDITY OF A FLUID
Filed Feb. 7, 1963

INVENTOR.
Paul McHenry Albert
BY
Barnard, McGlynn & Reising
ATTORNEYS

3,177,760
APPARATUS EMBODYING PLURAL LIGHT PATHS FOR MEASURING THE TURBIDITY OF A FLUID
Paul McHenry Albert, Ann Arbor, Mich., assignor, by mesne assignments, to Ex-Cell-O Corporation, Detroit, Mich., a corporation of Michigan
Filed Feb. 7, 1963, Ser. No. 258,663
5 Claims. (Cl. 88—14)

This invention relates to an apparatus for determining the turbidity of a fluid and is a continuation-in-part of my United States patent application Serial No. 806,570 filed April 15, 1959, now abandoned, entitled "Turbidity Indicator."

Devices for determining the turbidity of fluids, either gases or liquids, are well known as evidence by the numerous patents which have issued over the years covering various types of such devices. One common type incorporates a light-sensitive element arranged on one side of the fluid to be tested and a source of light arranged oppositely thereto, whereby the turbidity may be measured by determining the extent to which the light passing through the test fluid is absorbed by the particles. However, this absorption-type turbidity indicator is lacking in providing truly accurate readings, particularly where the turbidity being measured is quite low, and in recent years it has been the more common practice to utilize the so-called Tyndall effect for turbidity measurement. By the Tyndall effect is meant the phenomenon whereby light rays are reflected through an angle by the particles in the fluid which cause the turbidity. Hence by measuring the reflected light rays, the concentration of particles in the fluid, and therefore its turbidity, can be determined.

It is an object of the present invention to provide an improved Tyndall-effect type turbidity indicator which has extremely high sensitivity and yet which is of relatively simple and therefore low cost construction. More specifically, it is an object of the present invention to provide a turbidity indicator which incorporates one or more photosensitive elements to measure the light reflected by the particles in the fluid from the plurality of light beams directed therethrough, the arrangement of components being such as to provide optimum sensitivity and to minimize the undesirable effect of stray light in the fluid. Another object of the invention is the provision of a turbidity indicator of the type described which utilizes the light from a given light source with optimum efficiency to provide turbidity readings of high sensitivity.

Briefly, these objects are accomplished in accordance with the invention by a device which includes a chamber for the fluid to be measured, at least one photosensitive element which is positioned to look into the chamber, and means for projecting through said chamber a plurality or light beams which are directed so as to be at an angle to each other and preferably also at an acute angle to the viewing axis of the photosensitive element. Each light beam comprises a bundle of substantially parallel light rays, and the beams are so directed that they overlap at a point on the viewing axis of the photosensitive element. Hence, the particles which are viewed by the photosensitive elment are illuminated from two sides thereby greatly increasing the amount of reflected light and hence the sensitivity. By directing the beams such that they are at an acute angle to the viewing axis of the photosensitive element, there is optimum assurance against the photosensitive element being affected by direct stray light from the light source. In the preferred embodiment, the light beams are directed through the fluid from oppositely disposed side walls of the viewing chamber and a plurality of light-sensitive elements are used, each having its viewing axis projecting through a point of overlap of the light beams. To further assure against the undesirable effect of stray light, the fluid is passed through the chamber in a path transverse to the light beams such that the particles in the fluid remain in the light beams only for a very short time during which time they are viewed by one or more of the photosensitive elements. As an additional feature, mirrors can be disposed in the side walls of the chamber, each mirror being on the viewing axis of a photosensitive element so as to further increase the amount of particle-reflected light which reaches the photosensitive elements.

The above and other objects, features, and advantages of the invention will appear more clearly from the following detailed description thereof, made with reference to the drawings in which.

Figure 1:
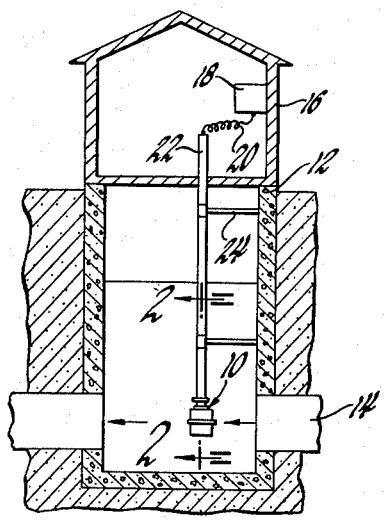
FIGURE 1 is a diagrammatic sectional and elevational view of the turbidity indicator shown in one of its uses with the tank and related structure being in section.

The turbidity indicator of the present invention is generally designated by the numeral 10 illustrated in use in a tank 12 having flow conduits 14 connected to the bottom thereof and having an enclosure 16 for the top. The control and meter unit 18 is located within the enclosure 16 and is connected to the indicator by virtue of an electrical conductor 20 received in a vertically extending pipe 22 supported by a plurality of brackets 24 or the like. The turbidity indicating unit 10 includes a generally rectangular hollow housing 26 secured to the lower end of the pipe 22 in any suitable manner and the housing or casing 26 may be of sectional construction and detachably connected together by a seal joint 28 for purposes of replacement of parts of the indicator unit and for maintaining the spacing or housing in sealed relation.

A transverse tunnel 30 is provided in the lower end portion of the casing 26 and the tunnel is defined by a generally inverted U-shaped wall 32 extending between the side walls of the casing 26 and rigid therewith. The bottom 34 of the casing is continuous and forms the bottom of the tunnel 30 thus forming a transverse passage for liquid or fluid to be tested.

Mounted adjacent the upper end of the casing 26 by any suitable means is a light source 36 which has a lens 38 spaced on each side thereof together with a mirror 40 disposed in angular relation whereby the light source will project light beams in two directions through the lenses 38 and onto the mirrors 40 whereby two light beams of equal intensity are reflected downwardly by mirrors 40 and will impinge upon a lower set of mirrors 42 which projects the light beam through a lens 44 and a transparent insert or window 46 in the side walls of the wall 32. The use of a single light source 36 in combination with the lenses and mirrors to provide the two beams of light has the advantage of better assuring that the beams are of equal intensity; however, it will be understood that a separate light source can be used for each beam if desired. For example, a light bulb with parabolic reflector, and with or without a lens, can be positioned about in the location of the lens 44 shown, to provide a beam of substantially parallel light rays. Another such light bulb-parabolic reflector assembly would of course be used on the opposite wall of the tunnel to provide the oppositely directed light beam.

The top wall of the tunnel is provided with glass discs 48 and overlying each disc 48 is a light-sensitive cell 50 and a monitor cell 52. Each cell 50 has a restricted light opening and lens to provide the cell a restricted generally cylindrical shaped viewing field. Disposed above the light-sensitive cells suitable electrical conductors are connected with the cells 50 and 52, and also with the light source 36, these conductors running upwardly through the pipe 32 to the unit 18.

Figure 5:
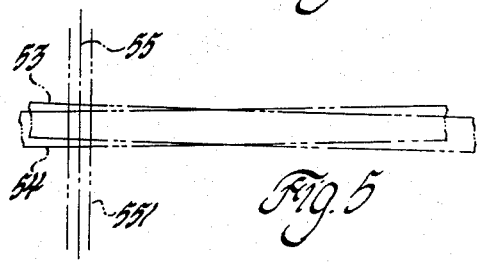
FIGURE 5 is a diagrammatic view showing the relationship of the multiple light beams and the viewing axis of the photosensitive element in the turbidity indicator.

It will be noted that the lenses 44 are arranged so that the light beams will not be in direct opposition to each other as they enter from opposite sides of the tunnel 32 but are arranged in slightly angular relation so that the point of intersection of the light beams is in the center of the tunnel 30. Each beam of light consists, of course, of a bundle of relatively parallel light rays, such that cross sections of the beam at all points along its length are of substantially the same shape and area. Since the angle between the light beams is slight, the beams will therefore overlap each other over a substantial portion of their length, there being a total overlap at the point of intersection of the axes of the beams and a partial though substantial overlap for a good distance outwardly along the beams from this point of intersection. This can best be seen in FIGURE 5 rather than from FIGURE 2 since in FIGURE 2 the angle between the light beams has been somewhat exaggerated for purposes of illustrating that the beams are at an angle. In FIGURE 5, 53 indicates one beam of light, 54 the other slightly angularly disposed and oppositely directed beam of light, and 55 the axis of the generally cylindrical viewing field 551 of the photosensitive element 50. It will be noted that the beams substantially overlap at the point of intersection of the viewing axis, and hence any particles within the volume of overlap and within the view of the photosensitive element will be illuminated from two sides, thereby increasing the total reflected light to the photosensitive element. Additionally, and as can best be seen in FIGURE 2 though also in FIGURE 5, each of the light beams is projected in a direction which is at an acute angle, slightly less than 90°, to the viewing axis of each of the photosensitive elements. The importance of this feature stems from the fact that it is impossible, as a practical matter, to accomplish a beam of absolutely parallel light rays; there will always be a certain number of random-directed light rays in the bundle. With each light beam directed so as to be at an acute angle to the viewing axes of the photosensitive elements, there is increased assurance against any stray light rays in the beams reaching the photosensitive elements to cause inaccurate readings. In other words, with the relationship of light beams and photosensitive elements as shown, there is increased assurance that the photosensitive elements will see only the light reflected by the particles in the fluid such that the readings from the photosensitive elements will be truly representative of the amount of turbidity.

The bottom 34 of the tunnel is provided with a pair of concave reflective lens mirrors 541 for reflecting the particle-reflected light upwardly toward the light sensitive cells 50. The bottom wall of the tunnel and the reflectors should preferably be removable for cleaning and to prevent the accumulation of sediment or the cleaning can be accomplished through the entrance and exit of the tunnel. The mirrors 541 are actually plano-convex lenses with the convex side silvered. This mirror presents a flush and smooth surface to the liquid flowing through the tunnel 32. Since the coefficient of refraction of glass and water are nearly equal, the silvered convex side provides an excellent concave mirror and no cavities are left in the tunnel for deposition of solids and maintenance is therefore simple. Preferably, each concave mirror should be oriented and should have a curvature such that its focal point is on the viewing axis of the photosensitive element with which the mirror is aligned, and within the volume of overlap between the two light beams. With such arrangement, the photosensitive element sees directly the reflected light from both sides of the top of each particle which is adjacent its viewing axis and within the volume of beam overlap, and also sees, by way of the aligned concave mirror, the reflected light, of about the same intensity, from both sides of the bottom of each such particle. Hence, the total reflected illumination from the particles reaching the photosensitive element is greatly increased thereby providing added sensitivity.

Figure 2:
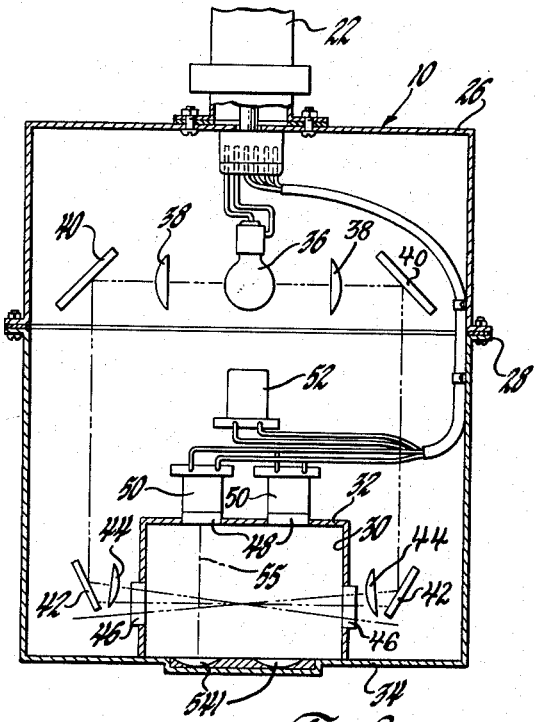
FIGURE 2 is a diagrammatic sectional and elevational view of the turbidity indicator shown in FIGURE 1.
Figure 4:
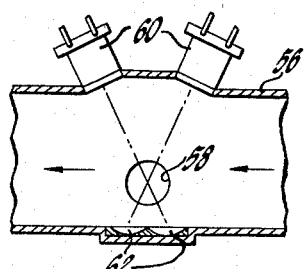
FIGURE 4 is a diagrammatic and sectional fragmental view of a modified form of the invention.

It will be noted that in the FIGURE 2 embodiment, the two photosensitive elements are arranged side by side on a line which extends in the direction of the light beams. Hence, in this embodiment each photosensitive element views a separate group of particles in the fluid. FIGURE 4 illustrates schematically another embodiment of the invention in which the photosensitive elements are arranged at an angle to each other and on a line, or more properly a radius, which extends transversely of the direction of the light beams. In the schematic drawing, 56 represents a liquid conduit, the direction of flow therein being indicated by the arrows, the angularly disposed photosensitive elements being shown at 60 and the oppositely disposed light beam admitting windows in the pipe being indicated at 58. The light beams are projected through the windows 58 from opposite sides of the pipe so that the beams intersect and therefore overlap at the center of the pipe. Further, and as can be seen in FIGURE 4, the viewing axes of the two photosensitive elements intersect also at the center of the pipe, and hence at the point of overlap of the light beams. In this embodiment, as in the embodiment shown in FIGURE 2, it is desirable that each of the light beams be projected in a direction which is at an acute angle, slightly less than 90°, to the viewing axes of the photosensitive elements so as to eliminate the undesirable effect of stray light. It will be noted that in the FIGURE 4 embodiment, both photosensitive elements view simultaneously the same group of particles in the fluid. For an additional increase in sensitivity, concave mirrors preferably of the same construction as those shown in FIGURE 2 can be included as indicated at 62, each mirror being aligned with the viewing axis of one of the photosensitive elements and ideally having a focal point adjacent the intersection of the light beams and the viewing axes of the photosensitive elements. If desired, the arrangement of photosensitive elements in FIGURE 4 can be combined with that of FIGURE 2 to provide maximum sensitivity. That is, instead of using only a pair of photosensitive elements as shown in FIGURE 2, two sets of photosensitive elements, each set being radially arranged, can be used; one set viewing one group of particles within the fluid, and the other set viewing another group of particles. Also, it will be understood that more than two photo cells can be used in each radially arranged set, and more than two sets of two such photosensitive elements may be used if desired.

In each of the embodiments shown in FIGURES 2 and 4, the direction of flow of the fluid is transverse to the direction of the light beams. Hence, any particle in the fluid moving through the viewing chamber remains in the light beams and is illuminated only for a relatively short period during which period it is viewed by one of the photosensitive elements or, in the case of the FIGURE 4 embodiment, by the set of photosensitive elements. This means that both immediately prior to and immediately after being viewed, the particle is not illuminated and hence cannot cause scattered light in the viewing chamber. This feature contributes to the sensitivity of the apparatus.

It is desirable of course to coat the interior walls of the viewing chamber with a dull black finish and it will be noted, particularly by reference to FIGURE 2, that each of the windows for admitting the light beam is sufficiently large to allow the oppositely disposed light beam to pass through it and hence out of the viewing chamber, where it is dissipated. These features also assure a minimum of undesirable random-directed reflected light from the walls of the viewing chamber.

Figure 3:
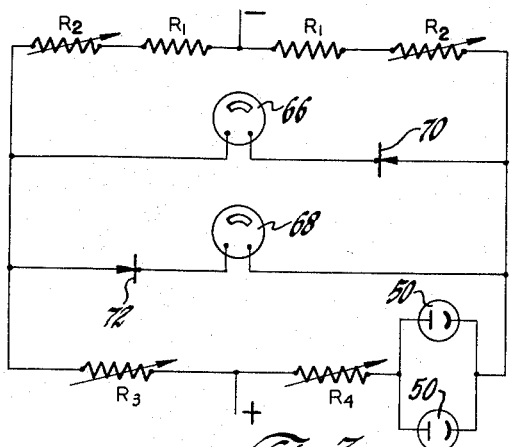
FIGURE 3 is a schematic view of the wiring diagram employed in the turbidity indicator.

FIGURE 3 illustrates schematically the electrical circuit employed in the FIGURE 2 embodiment though it will be obvious that a similar circuit can be used also with the FIGURE 4 embodiment or in an embodiment which combines the features of FIGURES 2 and 4. The light sensitive cells which are actually photo-conductive cells are illustrated at 50. Each of the resistance units $R_1$ has a value of 10,000 ohms while each of the resistances $R_2$ is variable from zero to 100,000 ohms. The resistance $R_3$ is variable from zero to 5 megohms and resistance $R_4$ is variable from zero to 100,000 ohms. The ammeters 66 and 68 are arranged in parallel and each is provided with a silicon rectifier 70 and 72 to prevent reversal of current in either meter. Meter 66 is a zero to 50 microammeter and meter 68 is a zero to 1 milliammeter.

The two light cells placed symmetrically as shown can be said to read the beams at the same point of intensity. As each cell views a definite portion not read by the other cell, a single particle of turbidity under one cell will cause a reading in that cell but not in the other. Since the cells are connected in parallel, an impulse or current is obtained. As both cells view the same liquid turbidity but different portions thereof, this arrangement may be said to average the readings from the two portions and therefore provide a better measurement of turbidity. The light sensitive cells are photo-conductive cells and have very high resistance when completely dark, that is, about 20 megohms. However, a very minute amount of light will result in a decrease in resistance. The light intensities as used in this instrument produce a reading of resistance of about 4,000 ohms when measuring turbidities of 1500 p.p.m. (silical scale) and the two cells connected in parallel then have a range of resistance from 10 megohms at zero turbidity to 2,000 ohms at 1500 p.p.m. In reading turbidity, good readings near zero turbidity are difficult since the readings are quite compressed and it is difficult to calibrate accurately near zero. Therefore, to enlarge the readings near zero turbidity, a resistance bridge is provided as indicated in FIGURE 3 and the bridge may be arranged to cause the microammeter to read currents in the bridge caused by cell resistance above 1 megohm and the milliammeter will read current caused by resistance values less than 1 megohm. Obviously, other values of resistance may be used to expand or reduce the sensitivity of selected portions of the range of turbidity. By increasing or decreasing the power to the light source, various selected ranges of turbidity between zero and 1500 p.p.m. may be enlarged or compressed in sensitivity. Ranges of turbidity above 1500 p.p.m. to somewhat above 10,000 p.p.m. may also be measured by this instrument within the range of light power provided for turbidities below 1500 p.p.m. Such heavy turbidities as 10,000 p.p.m. may also be labeled as suspensions or slurries and are often designated by percentages of dry weight of material to weight of water or liquid. For instance, measurements of paper pulp suspensions in the range of 1.1% to 6 or 7% are as feasible and accurate as low turbidities of the silica scale.

The device of the present invention has many obvious utilities including the use at a water intake to allow selection of that intake port producing water with least turbidity. In a water treatment plant it can be used in more than one location to measure turbidity of flowing water as well as in the lab. In a sewage treatment plant, it can monitor the effluent and provide, by measuring turbidity, an indication of biological oxygen demand which has a relation to turbidity in the effluent. Industrially, the consistency of pulp in the paper making process can be better controlled and in the exploration of reservoirs backed up by dams, it can easily indicate the turbidity and measure it very accurately. The device will perform well in any enclosed volume of liquid where ambient light is excluded or at depths and turbidities which form dark conditions. Suitable ambient light traps may be provided to shield the field of view of the cells when measurements are made under conditions where ambient light could affect the measurements. The source of power may be batteries or convenient alternating current. If alternating current is used, some means of stabilizing against fluctuation should be provided to reduce line current drift effects on the measurement. While photo-conductive cells are desirable, the present invention may also use emmisive type light sensitive cells. For extreme precision in measurement of liquids which vary greatly in temperature well known electrical temperature controls may be provided to stabilize the temperature of the cells and prevent drift caused by liquid temperature changes.

In actual tests using the device, the instrument has been found extremely accurate in measuring turbidity in almost any range. For example, measurements have been made, in fairly substantial increments, at levels as low as one part in 1,000,000,000 and at levels higher than 10,000 parts per million with the same instrument, thus rendering the device usable as a laboratory instrument as well as for the many other uses for which the same is adapted.

The forgoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

I claim:

1. Apparatus for measuring the turbidity of a fluid comprising a fluid chamber, means including light transparent windows in oppositely disposed walls of said chamber for projecting through said chamber two light beams of substantially parallel light rays from a single light source, said light beams being at a slight angle with respect to each other such that they intersect at about the center of said chamber and such that there is an extensive length along which said light beams overlap, a plurality of photosensitive elements in a wall of said chamber arranged side by side in a line which extends substantially parallelly the axes of said light beams and in a plane that includes the intersecting axes of said light beams, each of said photosensitive elements having a limited field of view and a viewing axis which passes through a portion of the fluid in said chamber in which said light beams overlap, each of said light beams being projected through said chamber in a direction which is at an angle of slightly less than 90° to the viewing axis of each of said photosensitive elements, means for passing fluid through said chamber in a direction which is substantially transverse to that of said light beams, a plurality of light condensing mirrors in the walls of said chamber each of said mirrors having an optical axis aligned with the viewing axis of one of said photosensitive elements and at least one indicating meter disposed in a resistance electrical bridge circuit comprising said photosensitive elements in one of its branches.

2. Apparatus for measuring the turbidity of a fluid comprising a fluid chamber, means including light transparent windows in oppositely disposed walls of said chamber for projecting through said chamber two light beams of substantially parallel light rays from a single light source, said light beams being at a slight angle with respect to each other such that they intersect at about the center of said chamber and such that there is an extensive lengh along which said light beams overlap, a pair of photosensitive elements in a wall of said chamber arranged side by side in a line which extends substantially parallelly the axes of said light beams and in a plane that includes the intersecting axes of said light beams, each of said photosensitive elements having a limited field of view and a viewing axis which passes through a portion of the fluid in said chamber in which said light beams overlap, each of said light beams being projected through said chamber in a direction which is at an angle of slightly less than 90° to the viewing axis of each of said photosensitive elements, means for passing fluid through said chamber in a direction which is substantially transverse to that of said light beams, a pair of light condensing mirrors in the walls of said chamber, each of said mirrors having an optical axis aligned with the viewing axis of one of said photosensitive elements, and a resistance electrical bridge circuit having said photosensitive elements in one of the branches of said bridge circuit and two meters in parallel in a diagonal of said bridge circuit, each one of said meters being adapted to measure current flowing in one direction in said diagonal so as to give an indication of the amount of turbidity of the fluid causing an unbalance of said bridge circuit as a result of light reflected by particles present in the fluid impinging upon said photosensitive elements.

3. An apparatus for measuring turbidity within a body of fluid comprising a casing adapted to be immersed in the fluid to be tested, said casing having a passageway defined therein for passage of the fluid, a single light source disposed in said casing, said passageway having oppositely disposed light transmitting panels therein, a pair of light sensitive cells having a limited field of view, said light sensitive cells being mounted on said casing and disposed substantially so that the axes of said light sensitive cells are substantially perpendicular to an imaginary line joining the light transmitting panels, a pair of lens and mirror system disposed in the casing for transmitting two beams of light from the single source and projecting the beams of light towards each other through the oppositely disposed light transmitting panels whereby the light reflected by particles in the fluid substantially parallelly to the axes of the light sensitive cells impinges upon said light sensitive cells, reflective means mounted on said casing in direct opposition to the light sensitive cells for reflecting any light reflected by particles in the direction of the reflective means towards the cells for impingement of the reflected light on the light sensitive cells and a resistance electrical bridge circuit comprising said light sensitive cells in one branch and at least one meter in the bridge circuit diagonal so as to give an indication of the turbidity of said fluid.

4. An apparatus for measuring turbidity within a body of fluid comprising a casing adapted to be immersed in the fluid to be tested, said casing having a passageway defined therein for passage of the fluid, a single light source disposed in said casing, said passageway having oppositely disposed light transmitting panels therein, a pair of light sensitive cells having a limited field of view, said light sensitive cells being mounted on said casing and disposed substantially so that the axes of said light sensitive cells are substantially perpendicular to an imaginary line joining the light transmitting panels, a pair of lens and mirror systems disposed in the casing for transmitting two beams of light from the single source and projecting the beams of light towards each other through the oppositely disposed light transmitting panels whereby the light reflected by particles in the fluid substantially parallelly to the axes of the light sensitive cells impinges upon said light sensitive cells, reflective means mounted on said casing in direct opposition to the light sensitive cells for reflecting any light reflected by particles in the direction of the reflective means towards the cells for impingement of the reflected light on the light sensitive cells and a resistance electrical bridge circuit for measuring the amount of turbidity of said fluid, said bridge circuit comprising four resistance branches including variable resistors for balancing of the circuit, one of said branches having said light sensitive cells connected therein, said bridge circuit further comprising a diagonal having two parallel connected meters disposed in series with unidirectional current conductive means so as to give an indication of the current flowing in either direction across said diagonal as a result of light impinging upon said light sensitive cells causing an unbalance of said bridge circuit.

5. Apparatus for measuring the turbidity of a fluid comprising a fluid chamber, means including light transparent windows in oppositely disposed walls of said chamber for projecting through said chamber two light beams of substantially parallel light rays from a single light source, said light beams being at a slight angle with respect to each other such that they intersect at about the center of said chamber and such that there is an extensive length along which said light beams overlap, a pair of photosensitive elements in a wall of said chamber arranged side by side in a line which extends substantially parallelly the axes of said light beams and in a plane that includes the intersecting axes of said light beams, each of said photosensitive elements having a limited field of view and a viewing axis which passes through a portion of the fluid in said chamber in which said light beams overlap, each of said light beams being projected through said chamber in a direction which is at an angle of slightly less than 90° to the viewing axis of each of said photosensitive elements, means for passing fluid through said chamber in a direction which is substantially transverse to that of said light beams, a pair of light condensing mirrors in the walls of said chamber each of said mirrors having an optical axis aligned with the viewing axis of one of said photosensitive elements, and a resistance electrical bridge circuit for measuring the amount of turbidity of said fluid, said bridge circuit comprising four resistance branches including variable resistors for balancing of the circuit, one of said branches having said light sensitive cells connected therein, said bridge circuit further comprising a diagonal having two parallel connected meters disposed in series with unidirectional current conductive means so as to give an indication of the current flowing in either direction across said diagonal as a result of light impinging upon said light sensitive cells causing an unbalance of said bridge circuit.

References Cited by the Examiner
UNITED STATES PATENTS

| | | | |
|---|---|---|---|
| 2,301,367 | 11/42 | Cahusac et al. | 250—218 X |
| 2,485,588 | 10/49 | Grant | 88—14 |
| 2,549,866 | 4/51 | Uhl | 88—14 |
| 2,580,500 | 1/52 | Albert | 88—14 |
| 2,682,613 | 6/54 | Uhl. | |
| 2,876,364 | 3/59 | Goody | 88—14 X |
| 3,098,931 | 7/63 | Lewin | 88—14 X |

FOREIGN PATENTS

| | | |
|---|---|---|
| 728,032 | 4/32 | France. |
| 613,722 | 5/35 | Germany. |
| 675,911 | 5/39 | Germany. |

JEWELL H. PEDERSEN, *Primary Examiner.*